United States Patent
Rahim et al.

(10) Patent No.: US 11,907,631 B2
(45) Date of Patent: Feb. 20, 2024

(54) RESET DOMAIN CROSSING DETECTION AND SIMULATION

(71) Applicant: Synopsys, Inc., Mountain View, CA (US)

(72) Inventors: Fahim Rahim, Palo Alto, CA (US); Paras Mal Jain, Mountain View, CA (US); Rajarshi Mukherjee, San Jose, CA (US); Deep Shah, Mountain House, CA (US); Satrajit Pal, Milpitas, CA (US); Dipit Ranjan Senapati, Pleasantan, CA (US); Abhishek Kumar, Noida (IN)

(73) Assignee: Synopsys, Inc., Sunnyvale, CA (US)

( * ) Notice: Subject to any disclaimer, the term of this patent is extended or adjusted under 35 U.S.C. 154(b) by 130 days.

(21) Appl. No.: 17/480,574

(22) Filed: Sep. 21, 2021

(65) Prior Publication Data
US 2022/0092244 A1 Mar. 24, 2022

Related U.S. Application Data

(60) Provisional application No. 63/089,860, filed on Oct. 9, 2020, provisional application No. 63/082,803, filed on Sep. 24, 2020.

(51) Int. Cl.
*G06F 30/3312* (2020.01)
*G06F 30/31* (2020.01)
*G06F 119/12* (2020.01)

(52) U.S. Cl.
CPC .......... *G06F 30/3312* (2020.01); *G06F 30/31* (2020.01); *G06F 2119/12* (2020.01)

(58) Field of Classification Search
CPC .. G06F 30/31; G06F 30/3308; G06F 30/3312; G06F 30/3323; G06F 2119/12
See application file for complete search history.

(56) References Cited

U.S. PATENT DOCUMENTS

| 10,936,774 B1 * | 3/2021 | Katzir ..................... G06F 30/20 |
| 2016/0098511 A1 * | 4/2016 | Cecil ................... G03F 7/70441 716/51 |

* cited by examiner

*Primary Examiner* — Jack Chiang
*Assistant Examiner* — Aric Lin
(74) *Attorney, Agent, or Firm* — Patterson + Sheridan, LLP (57) ABSTRACT

Reset Domain Crossing (RDC) detection and simulation is provided via identifying a plurality of RDCs between flip-flops of a sequence of flip-flops leading to an observation point in a circuit design; classifying each RDC of the plurality of RDCs as one of observable at the observation point or not observable at the observation point based on a reset order applied to the sequence of flip-flops; and outputting a list of the plurality of RDCs classified as observable at the observation point.

19 Claims, 8 Drawing Sheets

RESET DOMAIN CROSSING DETECTION AND SIMULATION

CROSS-REFERENCES TO RELATED APPLICATIONS

The present disclosure claims priority to U.S. Provisional Patent Application No. 63/089,860 filed Oct. 9, 2020, entitled "RESET DOMAIN CROSSING DETECTION" and U.S. Provisional Patent Application No. 63/082,803 filed Sep. 24, 2020, entitled "RESET DOMAIN CROSSING JITTER IN SIMULATION", each of which is incorporated herein by reference in its entirety.

TECHNICAL FIELD

The present disclosure relates to electrical circuit design, and more particularly to identifying and handling reset domain crossings between memory blocks, such as flip-flops.

BACKGROUND

Flip-flops (also referred to as flops, FFs, or latches) are circuit elements that combine several logical gates to receive, store, and forward state information (e.g., logical 1/TRUE or logical 0/FALSE) as memory blocks in a circuit design. Various configurations of flip-flops can be combined to provide sequential logic control based on control signals, such as clock (CLK), enable (E), set (S), and reset (R) signals. When data are transmitted from a first flip-flop to a second flip-flop that are controlled by different control signal sources, a domain crossing is said to occur. For example, when a second flip-flop receives a reset signal from a second source and receives data from a first flip-flop that receives a reset signal from a first source, a Reset Domain Crossing (RDC) exists between the first and second flip-flops. Similarly, when a second flip-flop receives a clock signal from a second source and receives data from a first flip-flop that receives a clock signal from a first source, a Clock Domain Crossing (CDC) exists between the first and second flip-flops.

Different types of domain crossings can lead to different problems in a finalized circuit, and are addressed by different solutions. RDCs can lead to metastability in a sequence of flip-flops, where the flip-flop enters a state that is neither (or at least unreliably interpretable as) logical 1/TRUE or logical 0/FALSE; losing or garbling the value passed to the flip-flop from upstream flip-flops. Downstream flip-flops can interpret this metastable value as logical 1/TRUE or logical 0/FALSE and may assign the logical value based on a "best guess" for what the actual logical value should be, which can lead to the downstream flip-flops sometimes correctly, and sometimes incorrectly, passing on the original logical value, thus introducing unpredictable and difficult to trace errors in the logical flow.

Additionally, the use of asynchronous resets is becoming more prevalent as a result of an increase in the use of multiphase power-up boot sequences as well as an increasingly large software stack on hardware. Increases in software stacks have blurred the line between software and hardware, primarily as a mechanism for mimicking a tight integration of digital technology in daily life. To support the increases in software stacks in integrated circuit (IC) design or system on chip (SoC) design, the design is broken down into multiple blocks. Each block may be independently responsible for a different task supported by the device in which the SoC or IC is used. Each block, once the associated task is complete, is reset to a default or initial state, conventionally using software driven asynchronous reset. Asynchronous reset application (or assertion) is not synchronous with the IC's or SoC's clocks which creates timing failures in the form of metastability. Therefore, RDC issues are causing more and more design errors.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments of the present disclosure relate to detecting and handling Reset Domain Crossings (RDCs) in circuit design. A design tool identifies RDCs between sequential elements, such as the flip-flops in a sequence of flip-flops, and determines whether the RDC produced an observable effect at an observation point. When the RDC is not observable at the observation point, for example due to an intervening reset, the design tool recommends removing extraneous metastability countermeasures, thus simplifying the design and improving the efficiency of the circuit. When the RDC is observable at the observation point, the design tool recommends various metastability countermeasures to include in the circuit design, thus mitigating the metastability and improving the consistency of the circuit design.

Although the examples given herein primarily refer to flip-flops as the sequential elements of a circuit, the present disclosure also contemplates detecting and handling RDCs between other memory blocks arranged in sequence, which may include heterogeneous or homogeneous combinations of elements arranged in direct or branching sequences.

Figure 1:
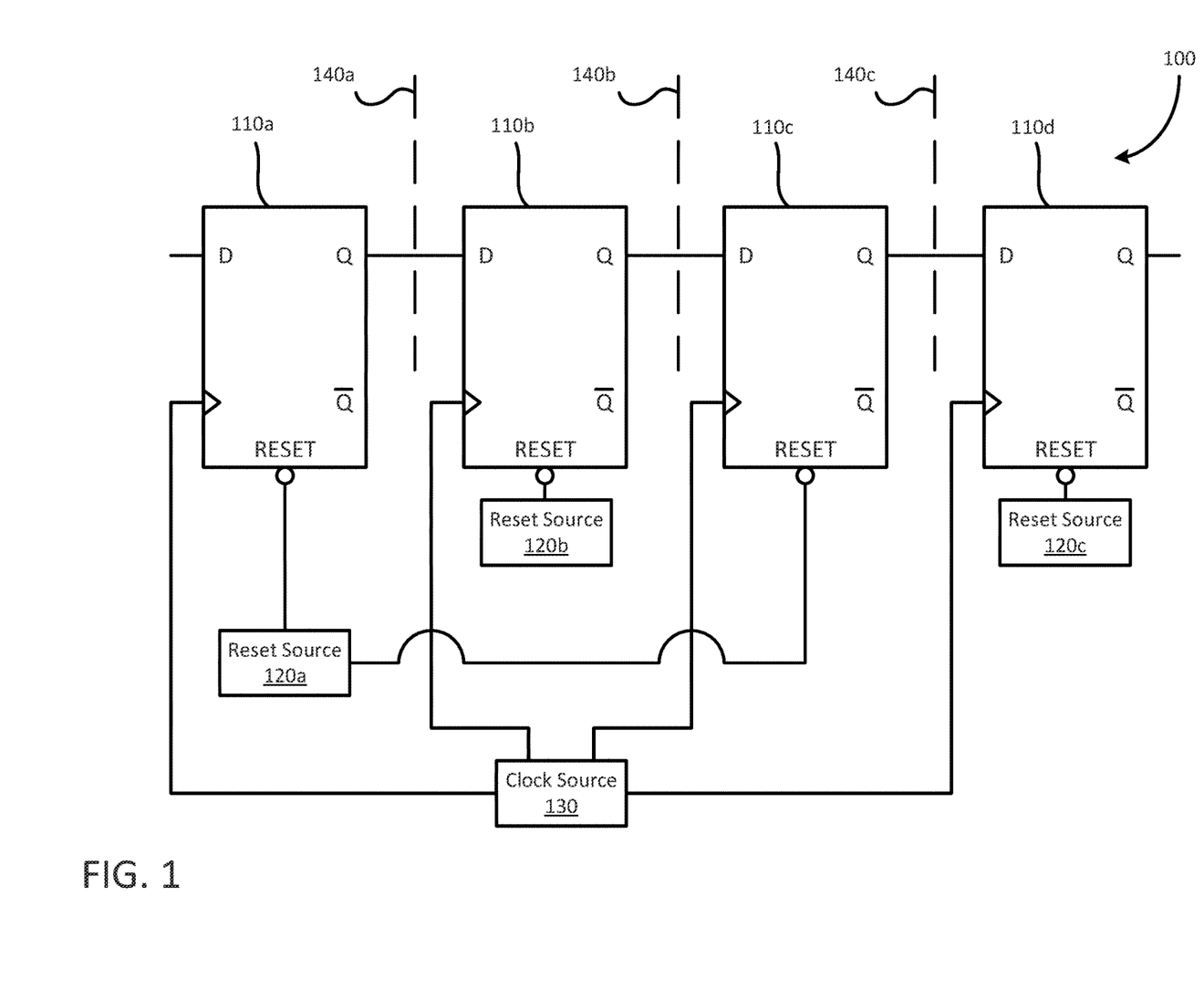
FIG. 1 illustrates a circuit design including a sequence of flip-flops, according to embodiments of the present disclosure.

FIG. 1 illustrates a circuit design 100 including a sequence of flip-flops 110a-d (generally or collectively, flip-flops 110), according to embodiments of the present disclosure. As will be appreciated, sequences of flip-flops 110 can include one or more fewer individual flip-flops 110 from that shown in FIG. 1. Similarly, although illustrated as DQ flip-flops in FIG. 1, in other embodiments, the flip-flops 110 may be of various designs.

The first flip-flop 110a receives a reset signal from a first reset source 120a (generally or collectively, reset source 120), the second flip-flop 110b receives a reset signal from a second reset source 120b, the third flip-flop 110c receives a reset signal from the first reset source 120a, and the fourth flip-flop 110d receives a reset signal from a third reset source 120c. Because the first flip-flop 110a and the third flip-flop 110c are controlled via shared first reset source 120a, the first flip-flop 110a and third flip-flop 110c belong to a first reset domain. The second flip-flop 110b and the fourth flip-flop 110d, however, belong to a second reset domain and a third reset domain respectively, based on being controlled via the second reset source 120b and the third reset source 120c.

In FIG. 1, each of the flip-flops 110a-d receives a clock signal from a clock source 130. Accordingly, each of the flip-flops 110a-d belong to the same clock domain. In various embodiments, the flip-flops 110 in a sequence under analysis can belong to one shared clock domain or a plurality of clock domains and various formats of clock sources (e.g., combinational clocks) may be used.

The output Q from the first flip-flop 110a is received as the input D for the second flip-flop 110b, crossing from the first reset domain to the second reset domain to define a first RDC 140a (generally or collectively, RDC 140). Similarly, the output Q from the second flip-flop 110b is received as the input D for the third flip-flop 110c, crossing from the second reset domain to the first reset domain to define a second RDC 140b and the output Q from the third flip-flop 110c is received as the input D for the fourth flip-flop 110d, crossing the first reset to domain to the third reset domain to define a third RDC 140c.

Although an RDC 140 exists between neighboring flip-flops 110 controlled by different reset sources 120 (e.g., belonging to different reset domains), not all of these RDCs 140 result in observable downstream metastability issues.

Figure 2A:
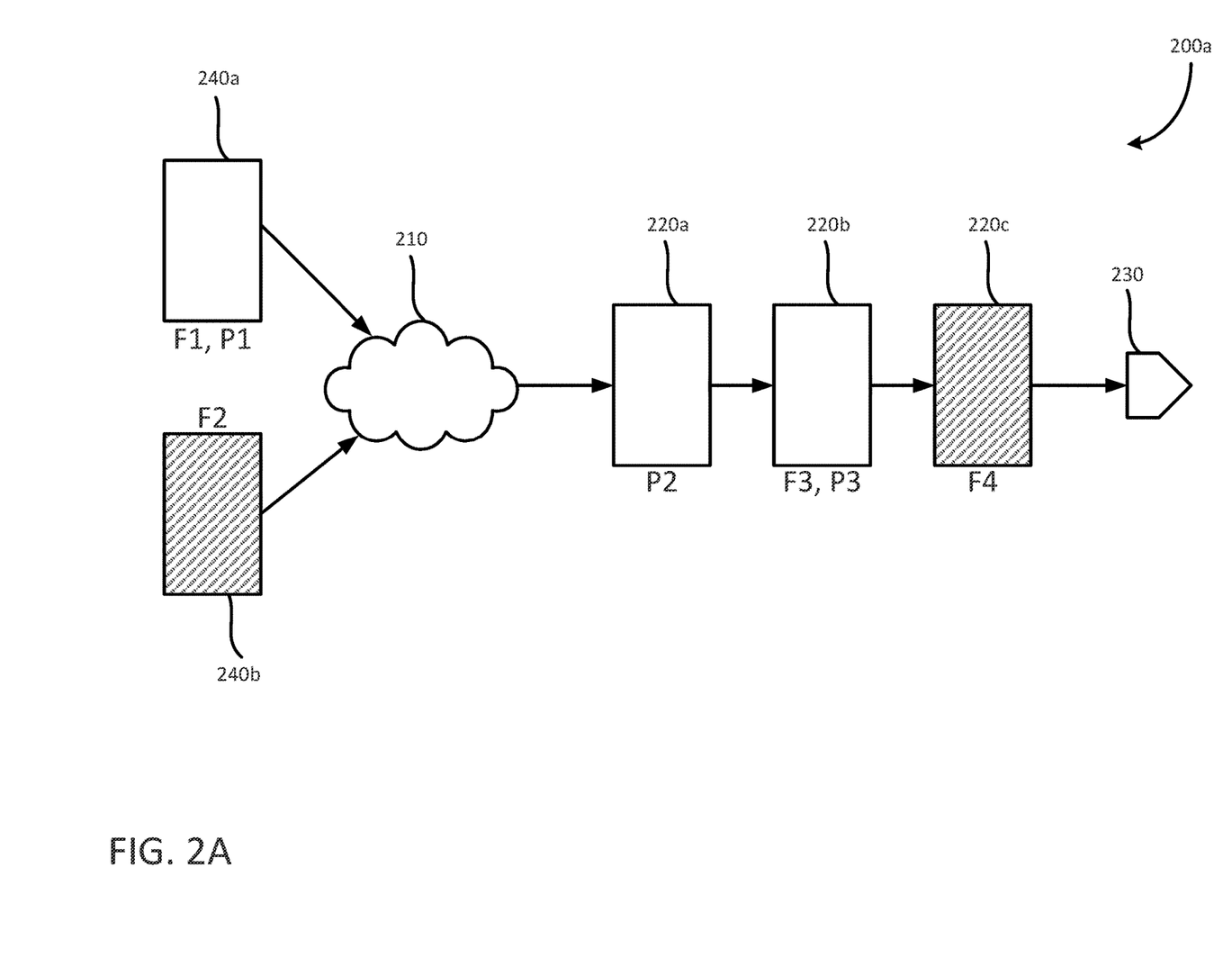
FIG. 2A illustrates metastability propagation in Power On Reset mode, according to embodiments of the present disclosure.
Figure 2B:
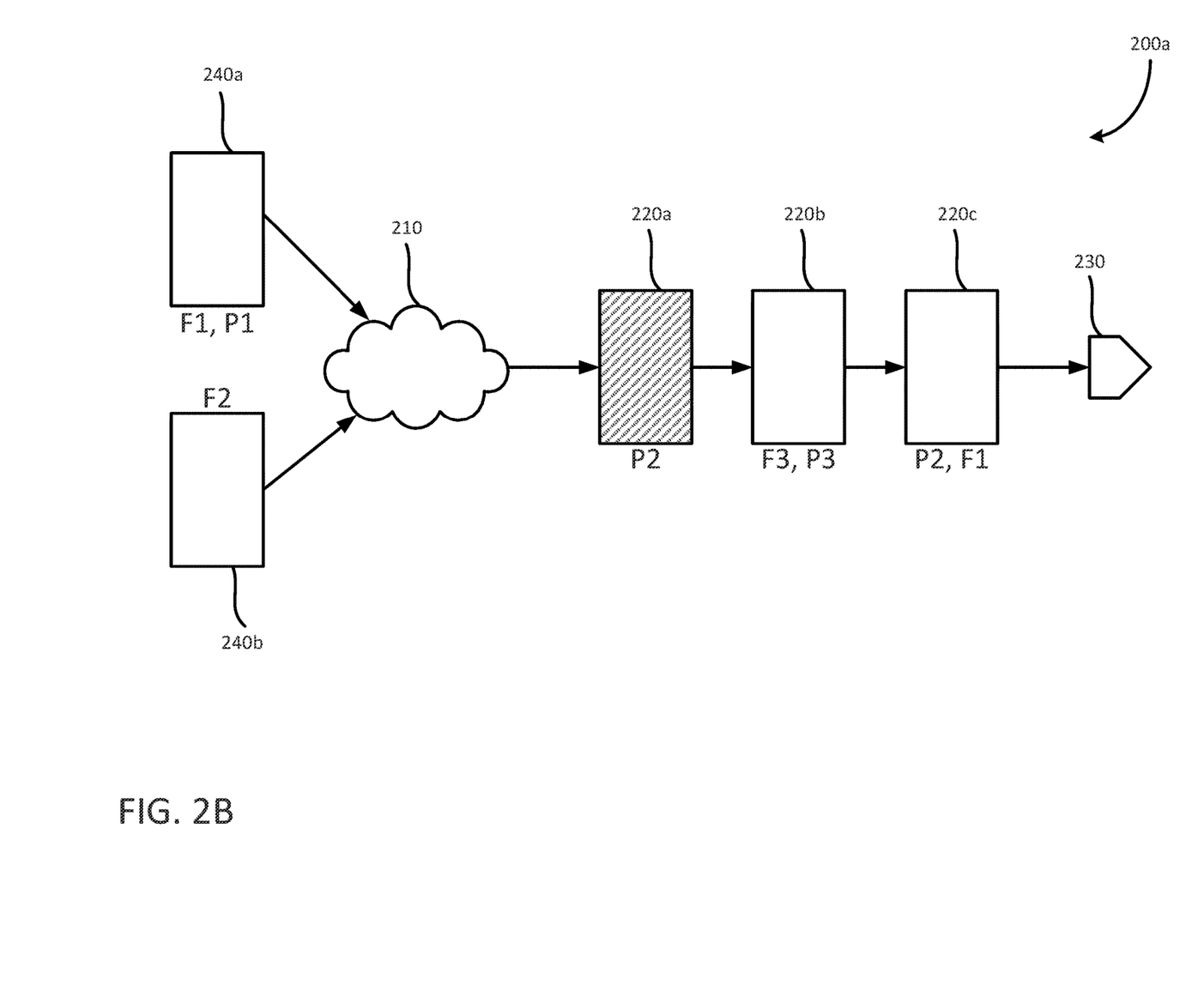
FIG. 2B illustrates metastability propagation in functional reset mode, according to embodiments of the present disclosure.

FIG. 2A and FIG. 2B show metastability effect propagation in different operational modes for a chip including a sequence of flip-flops, according to embodiments of the present disclosure. FIG. 2A illustrates metastability effect propagation in Power On Reset (POR) mode, while FIG. 2B illustrates metastability effect propagation in functional reset mode. For example, when a chip is coming online, various Power on Resets (POR) transition to bring the flip-flops 110 to a known state, and when the chip is in the functional mode, various functional resets are asserted to reset the flip-flops 110. However, the resets used in each of the modes are distinct from one another; there is no interaction between the functional resets and the PORs. Accordingly, detection of observable RDCs is performed separately for each operational mode.

To aid in understanding the separate analyses, both FIG. 2A and FIG. 2B show identical circuit layouts with different reset patterns 200a, 200b based on the mode of operation for the circuit. An input logic 210 provides an input to a series of sequential flip-flops 220a-c, which provide an output at an observation point 230 in a simulation of the circuit. The input logic 210 is a combinational logic that receives inputs from a first input flip-flop 240a and a second input flip-flop 240b. In various embodiments, more or fewer elements may be provided in various layouts.

The various resets for each of the flip-flops are designated by the flip-flop as Fx (for Functional resets) and as Px (for PORs), where the numeral indicates when the given reset occurs relative to the other resets of the same type (e.g., F1 occurs before F2, and F3 occurs between F2 and F4).

In the POR mode shown in FIG. 2A, the first reset pattern 200a sets the first POR (P1) at the first input flip-flop 240a, the second POR (P2) at the first sequential flip-flop 220a, and the third POR (P3) at the second sequential flip-flop 220b. In POR mode, the sequential flip-flops 220a-c with functional resets behave like resetless (i.e., not having a reset input) flip-flops, and the reset orders are inferred from a reset waveform provided by a user or test device. The resetless flip-flops are shown with shading, and may be ignored for the purposes of metastability effect tracing. Accordingly, an observability checker reports the following in the illustrated first reset pattern 200a: P1 is not observable at the observation point 230 due to the reset order inferred between P1 and P3 in the waveform specification resolving any metastability induced via P1; P2 is observable at the observation point 230 due to F3 asserting at the second sequential flip-flop 220b with an unknown time relative to the P3 reset; and P3 is observable at the observation point 230 due there being no further (non-resetless) flip-flops in the sequence to override any metastability initiated upstream.

In the functional mode shown in FIG. 2B, the reset pattern 200b is defined by user constraints and the sequential flip-flops with only POR are treated as resetless. Accordingly, an observability checker reports the following in the illustrated second reset pattern 200b: metastability at the first sequential flip-flop 220a is not observable at the observation point 230 due to F2 asserting at the second input flip-flop 240b before F3 is asserted at the second sequential flip-flop 220b; metastability at the second sequential flip-flop 220b is observable at the observation point 230 due to F3 asserting after F1 has been asserted at the third sequential flip-flop 220c; and metastability is observable at the observation point 230 from the third sequential flip-flop 220c due to there being no further flip-flops in the sequence to override any metastability initiated at the third sequential flip-flop 220c.

Figure 3:
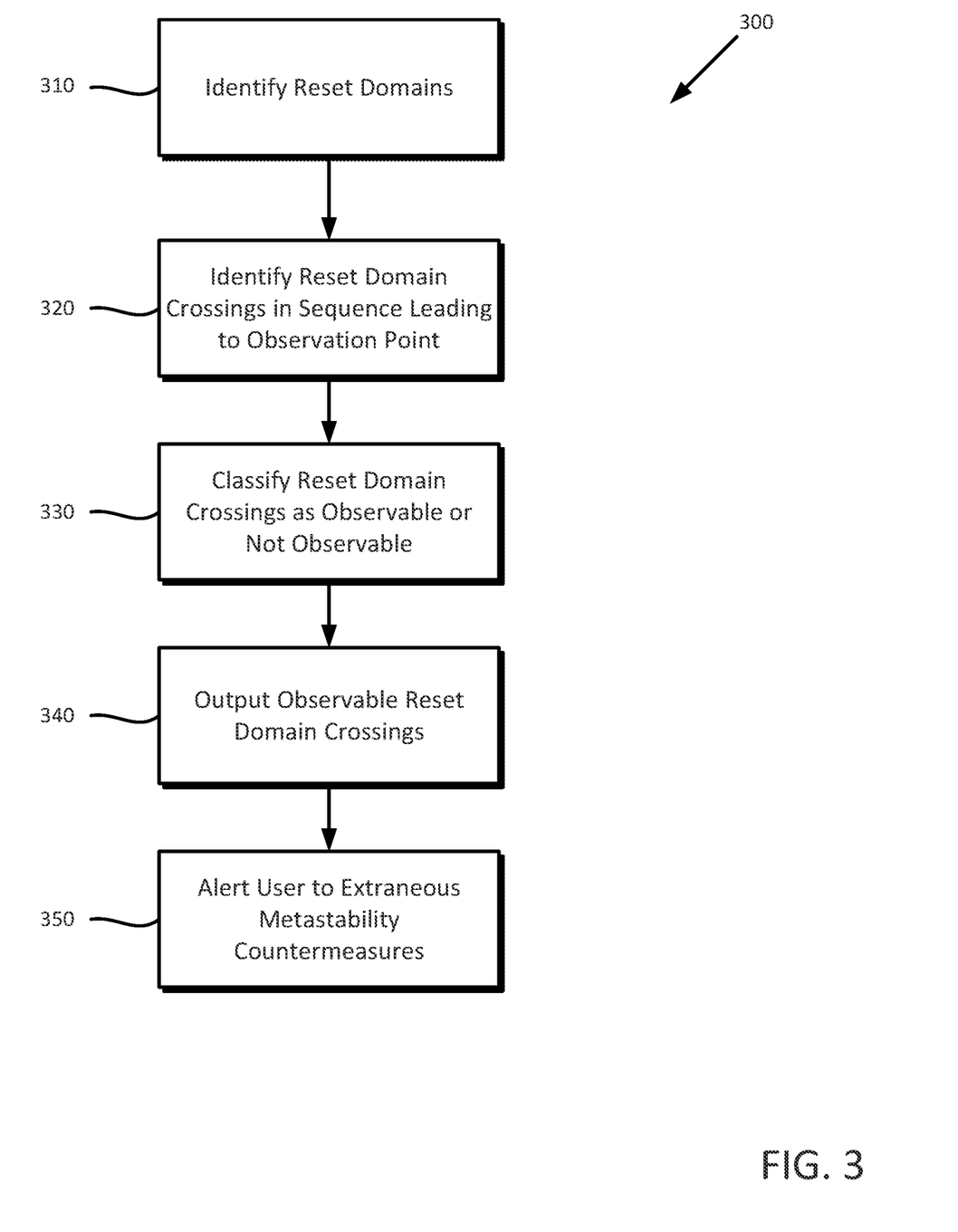
FIG. 3 is a flowchart of a method for reporting and handling observable RDCs versus unobservable RDCs, according to embodiments of the disclosure.

FIG. 3 is a flowchart of a method 300 for reporting and handling observable RDCs versus unobservable RDCs, according to embodiments of the disclosure. Method 300 begins at operation 310, where the observation checker includes in a circuit simulator identifies the reset domains in the circuit design (e.g., by identifying the unique reset sources 120). At operation 320, the observation checker identifies the RDCs in the circuit design that occur between sequential flip-flops in a sequence of flip-flops that belong to different reset domains. In various embodiments, the RDCs occur between flip-flops belonging to the same or different control domains for clock signals or other control signals. Stated differently, the RDCs are determined independently of the other control domains that the flip-flops belong to.

For example, when the observation checker identifies a first flip-flop that belongs to a first reset domain that provides outputs received by a second flip-flop as its inputs, where the second flip-flop belongs to a second reset domain, the observation checker identifies an RDC between the first and second flip-flops. Accordingly, the output of the second flip-flop may be subject to metastability effects due to the RDC.

At operation 330, the observation checker classifies the identified RDCs as being either observable or not observable at an observation point downstream from the sequence of flip-flops. The observation checker identifies which RDCs are observable (or not observable) at one or more observation points in the circuit design based on various reset orders (e.g., a POR order or a functional order) or clock orders.

Continuing the above example, a potential metastability in the second flip-flop may propagate effects to downstream flip-flops (e.g., a third flip-flop receiving as its input the output from the second flip-flop) and eventually to an observation point, or the effects may be resolved before reaching the observation point. For example, a metastability countermeasure, such as a signal-controlling gate associated with the second flip-flop (or a downstream flip-flop), a reset order causing the unknown/metastable value being cleared before reaching the observation point, etc., can resolve the metastability before reach the observation point. The observation checker therefore traces the metastable effects from the RDC through the sequence of flip-flops to determine whether to classify the RDC as generating an observable metastability effect or a non-observable metastability effect.

At operation 340, the observation checker outputs the observable RDCs to a user, for example, in a series of alerts in a software package for circuit design. In various embodiments, the alerts indicate which flip-flops are the sources of the metastability effects and recommend one or more new metastability countermeasures to take to remove the metastability effects or render the metastability effects unobservable at the observation point. In various embodiments, the metastability countermeasures include, but are not limited to: a re-ordering of the reset order, the clock order, changing or shifting a reset domain for at least one flip-flop associated with a given RDC to remove the given RDC, and a gate providing additional timing control the least one flip-flop associated with the given RDC. In one embodiment, the software package ignores the RDCs that are not observable, since countermeasures may not be needed.

At operation 350, the observation checker alerts the user to any extraneous metastability countermeasures identified in the circuit design. The extraneous metastability countermeasures can include control gates and other circuit elements that were initially included in the circuit design before running the simulation that, if removed, would not result in an unobservable RDC becoming observable. In various embodiments, the observation checker automatically removes extraneous metastability countermeasures from the circuit design, or may prompt the user to confirm removal of such extraneous metastability countermeasures.

Figure 4:
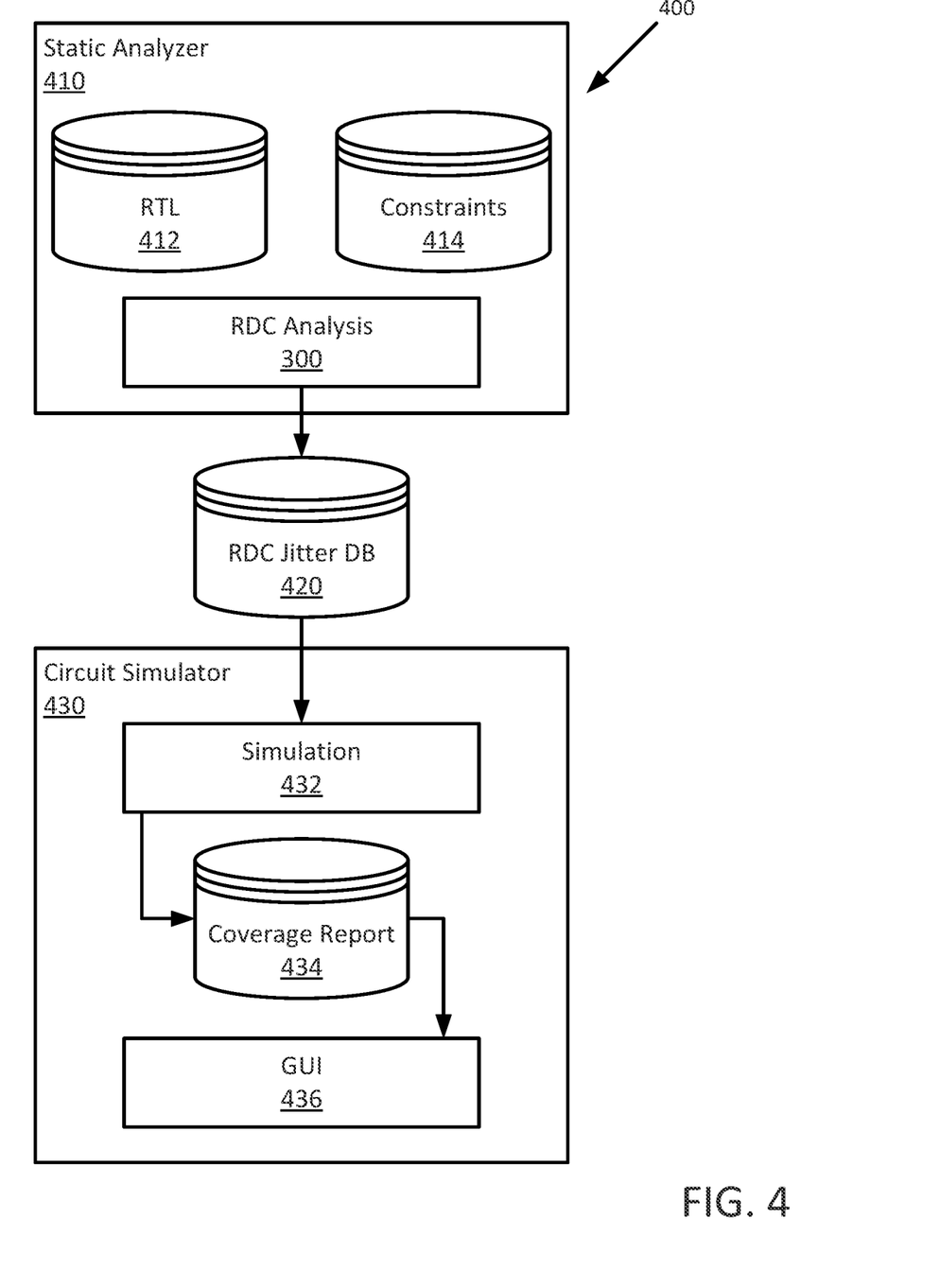
FIG. 4 illustrates example procedures for instrumenting jitter in simulation for RDC paths to gauge the impact of jitter errors in the downstream circuit of an IC design, according to embodiments of the present disclosure.

FIG. 4 illustrates example procedures 400 for instrumenting jitter in simulation for RDC paths to gauge the impact of jitter errors in the downstream circuit of an IC design, according to embodiments of the present disclosure.

A static analyzer 410 analyzes an IC design defined according to a Register Transfer level (RTL) description 412 of the logic of the integrated circuit and various constraints 414 for the construction thereof. In various embodiments, the static analyzer 410 is provided by the computer system 700 described in relation to FIG. 7.

The static analyzer 410 analyses the IC design to identify the RDC paths in the design, and to prune out some or all of the RDCs that an non-observable at the respective measurement or observation points in the layout. In various embodiments, the static analyzer 410 performs a RDC analysis 416, such as in method 300 described in relation to FIG. 3, but may identify additional RDC paths to prune out. For example, using method 300, the static analyzer 410 can identify and prune out RDCs paths as unobservable when those paths are synchronized by a qualifier signal present between a source sequential logic element and a destination sequential logic element so that metastability in the RDC path is resolved before reaching an observation point.

The static analyzer 410 uses the output of the RDC analysis 416 to build an RDC jitter database 420 for use in later simulation. The jitter database 420 of the paths through various flip-flop and other components on which to inject a jitter error signal. In various embodiments, the IC design includes several paths that are not of interest for jitter error testing during simulation. For example, RDCs paths that a user or software system indicates should be ignored during a test (e.g., as previously tested, or reserved for future testing) can be pruned from the jitter database 420 to avoid testing the designate paths. In another example, RDC paths that are known to not send a reset signal on during operation may be designated as "static" and can be pruned from the jitter database 420.

A circuit simulator 430 uses the RDC jitter database 420 when performing a simulation 432 of the IC design to actively inject RDC jitter error signals into the designated RDC paths included (e.g., not pruned from) the RDC jitter database 420. In various embodiments, the circuit simulator 430 is provided by the computer system 700 described in relation to FIG. 7.

The circuit simulator 430 runs a simulation 432 of the IC design (e.g., defined by the RTL description 412 and the constraints 414) with randomly assigned signal jitter through the path (e.g., an RDC jitter error signal). Jitter added to the logic signal causes deviation from a nominal periodicity or timing of a clock or other signal. The simulation 432 may be run at least twice; once without jitter to determine nominal logic operations and one or more times to determine how jitter affects the logic on the examined RDC paths.

The circuit simulator 430 generates a coverage report 434 that provides details of how the injected jitter affected the analyzed RDC paths. The coverage report 434 reflects the various information about each RDC jitter injected signal of the simulation 432. In some embodiments, a metric for reset assertion provides information about the source flip-flops which have asserted a reset at least once during the simulation. In some embodiments, a destination toggle metric provides information about the destination data which toggle (e.g., change from 0 to 1 or from 1 to 0) only due to source reset assertion. In some embodiments, a jitter error metric provides information about the signals on which RDC jitter error was injected from the RDC jitter database 420.

Table 1 below illustrates an example summary RDC jitter coverage report 434.

TABLE 1

RDC Jitter Summary
Total Number of RDC Monitored: 50

|  | Yes | No |
|---|---|---|
| Reset Assertion | 10 (20%) | 40 (80%) |
| Dest. D Toggle | 8 (80%) | 2 (20%) |
| Jitter Error | 6 (75%) | 2 (25%) |

Table 2 below illustrates an example detailed RDC jitter coverage report 434.

TABLE 2

RDC Jitter Detailed View

| RDC Id | Dest Name | Reset Assertion | Dest. D Toggle | Jitter Error |
|---|---|---|---|---|
| 1 | tb.u1.des1 | 6 | 4 | 3 |
| 2 | tb.u1.des2 | 4 | 4 | 2 |

In various embodiments, the coverage report 434 is output to a user via a display device according to numerically present the values for the various metrics (e.g., as read-outs of Table 1 and Table 2). Additionally or alternatively to numerical presentations, the circuit simulator 430 can render the coverage report 434 for display via a Graphical User Interface (GUI) 436 on the display device, to show the waveforms relative to the flip-flops in the RDC paths affected (or unaffected) by the injected jitter error signals.

Figure 5:
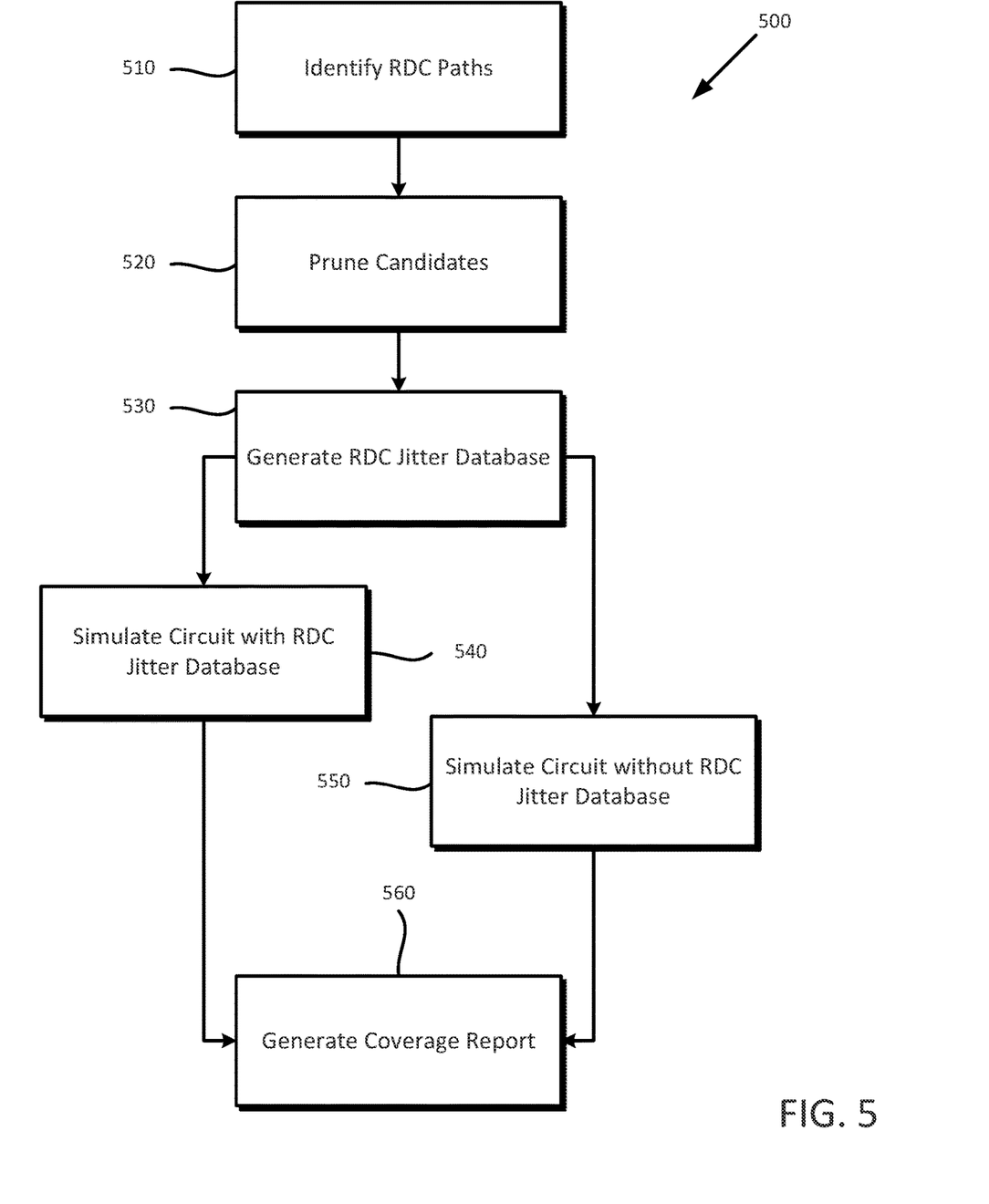
FIG. 5 is a flowchart of a method for circuit simulation with RDC jitter injection, according to embodiments of the present disclosure.

FIG. 5 is a flowchart of a method 500 for circuit simulation with RDC jitter injection, according to embodiments of the present disclosure. Embodiments of the present disclosure solve the complex verification of deep sequential RDC paths using RDC jitter that previous RDC verification tools cannot. Method 500 begins at operation 510, where an analysis system, such as the static analyzer 410 of FIG. 4 or computer system 700 of FIG. 7, identifies the RDC paths in an IC design to be analyzed. At operation 520, the analysis system prunes candidate RDC paths from the identified RDC paths where the RDC is not observable. Additionally or alternatively, the analysis system prunes out RDC paths that are marked to be ignored or that are static. In various embodiments, operation 510 and operation 520 of method 500 may be performed in accordance with method 300 discussed in relation to FIG. 3.

At operation 530, the analysis system generates an RDC jitter database of the RDC paths to be analyzed in the IC design when simulating the circuit according to the IC design file. In various embodiments, a user or system may add or remove RDC paths from the RDC jitter database after initial creation. For example, a user may designate a first set of RDC paths to be ignored and a second set of RDC paths to be analyzed during a first simulation, and switch which set is ignored or analyzed for a second simulation. Accordingly, some or all of the RDC paths may be considered for jitter, and the analysis can exclude any RDC paths from analysis in a given simulation run that have been pruned or otherwise removed from consideration. The analysis may prune those RDC paths that are specified as static or ignored or those RDC paths synchronized by a qualifier present between a source and a destination. In some embodiments, the analysis system also checks any RDC paths for RDC jitter when those RDC paths have been filtered due to a user-defined reset sequence.

At operation 540, the analysis system simulates the IC design using the RDC jitter database to inject an RDC jitter error signal on the designed RDC paths and at operation 550, the analysis system simulates the IC design without injecting RDC jitter error signals. In various embodiments, the analysis system may perform operation 540 before operation 550, perform operation 550 before operation 540, perform operation 540 simultaneously with operation 550, or combinations thereof when multiple instances of operation 540 are performed with different jitter settings. In various embodiments, the frequency of the jitter injected frequency can be controlled or configured by a user of the analysis system.

In various embodiments, RDC jitter error is injected per operation 540 during simulation when various triggers are satisfied. In some embodiments, the trigger is satisfied when the destination data changes due to source reset assertion, when a destination flip flop reset is not asserted, when a destination enable condition is not inactive (e.g., is active), or combinations thereof. Because an IC design can include multiple sources, if the destination flip flop data changes due to any of the source reset assertion or due to multiple sources' resets, the destination flip flop data can be (re) analyzed for RDC jitter using different settings for the injected RDC jitter error signals or with medications to the IC design (e.g., the addition or removal of metastability countermeasures).

At operation 560, the analysis system uses the differences between the data observed with and without RDC jitter injection (per operation 540 and operation 550) to generate a coverage report that identifies the effects of the jitter on the circuit design. In various embodiments, the coverage report indicates one or more of reset assertion data, destination data toggle data, or jitter error data associated with the RDC jitter error signals. In various embodiments, the coverage report tabulates the metrics for a user to review the performance of the circuit design as a whole or for particular RFC paths. Additionally or alternatively to a tabulated coverage report, the analysis system can provide a GUI readout that shows the waveforms received by and output by the flip-flops and other logic elements in the RDC paths affected (or unaffected) by the injected jitter error signals.

Figure 6:
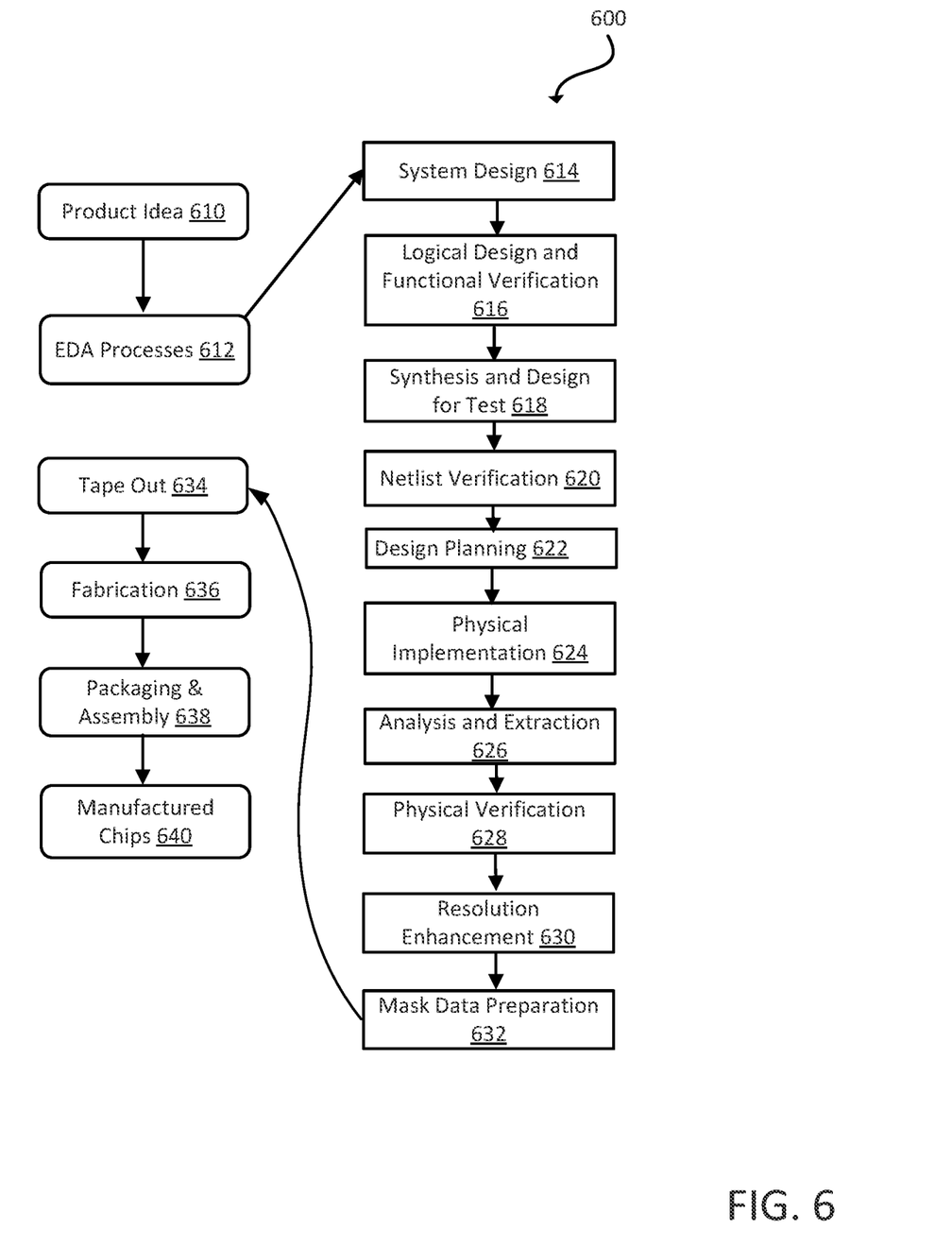
FIG. 6 illustrates an example set of processes used during the design, verification, and fabrication of an article of manufacture such as an integrated circuit to transform and verify design data and instructions that represent the integrated circuit, according to embodiments of the present disclosure.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 6. The processes described by be enabled by EDA products (or tools).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

Figure 7:
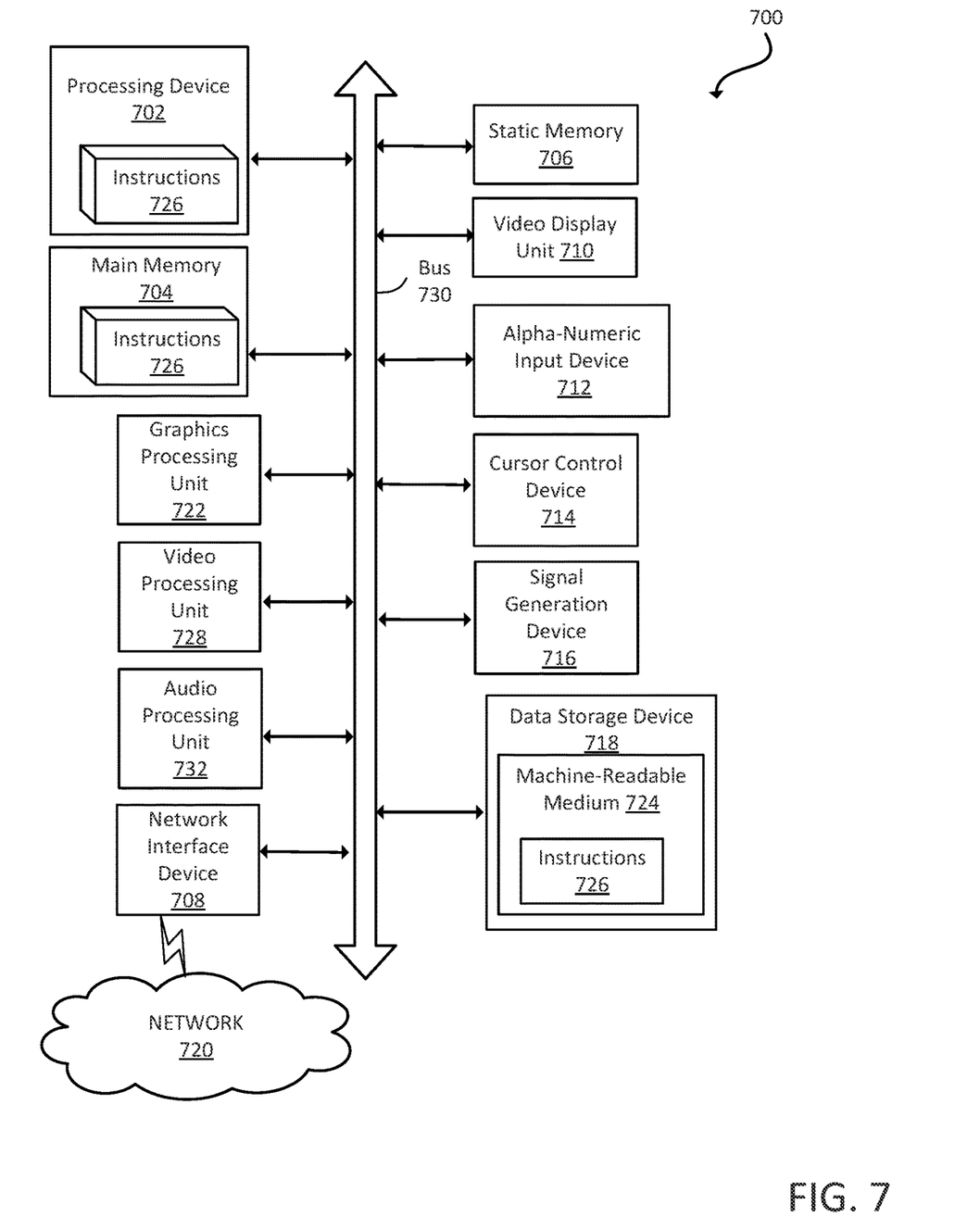
FIG. 7 illustrates an example machine of a computer system within which a set of instructions, for causing the machine to perform any one or more of the methodologies discussed herein, may be executed, according to embodiments of the present disclosure.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    identifying a plurality of reset domain crossings (RDCs) between sequential elements in a sequence of sequential elements connected to an observation point in a circuit design;
    classifying, by a processing device, each RDC of the plurality of RDCs as one of observable at the observation point or not observable at the observation point based on at least one of a reset order and a clock order applied to the sequence of sequential elements, wherein the classifying includes performing a simulation involving tracing of a metastability effect from the RDC through the sequence of sequential elements to determine whether to classify the RDC as generating an observable metastability effect;
    identifying, based on the simulation, a metastability countermeasure associated with the RDC, that if removed, would not result in an unobservable RDC becoming observable; and
    outputting an identification of the plurality of RDCs classified as observable at the observation point and an indication to remove the metastability countermeasure based on the identification.

2. The method of claim 1, further comprising:
    recommending another metastability countermeasure to include in the circuit design in association with each RDC of the plurality of RDCs classified as observable at the observation point.

3. The method of claim 2, wherein the metastability countermeasure includes at least one of:
    a re-ordering of the reset order;
    a reset domain shift for at least one sequential element associated with a given RDC to remove the given RDC; or
    a gate providing additional timing control the at least one sequential element associated with the given RDC.

4. The method of claim 1, further comprising:
    generating a jitter database of the plurality of RDCs classified as observable;
    simulating the circuit design;

injecting RDC jitter error signals on the plurality of RDCs classified as observable according to the jitter database; and generating a coverage report, the coverage report comprising one or more of reset assertion data, destination data toggle data, or jitter error data associated with the RDC jitter error signals.

5. The method of claim 4, wherein the coverage report identifies differences in output data on the plurality of RDCs classified as observable when the RDC jitter error signals are injected and when the RDC jitter error signals are not injected.

6. The method of claim 4, further comprising:
rendering the coverage report in a Graphical User Interface (GUI) on a display device, wherein the GUI shows waveforms including the RDC jitter error signals that are received by and output by the sequential elements and other logic elements in each RDC of the plurality of RDCs classified as observable at the observation point.

7. The method of claim 1, further comprising:
further pruning the plurality of RDCs to remove RDCs identified as at least one of static or ignored.

8. A non-transitory computer readable storage medium including instructions that when executed by a processor enable the processor to:
identify, in a circuit design, a first sequential element that belongs to a first reset domain and that generates a first output;
identify, in the circuit design, a second sequential element that belongs to a second reset domain and that receives the first output as an input and generates a second output; and
in response to determining metastability effects from metastability in the second output are unobservable at an observation point downstream from the second sequential element in the circuit design, simulating the circuit design with jitter injected on the first reset domain and not on the second reset domain.

9. The non-transitory computer readable storage medium of claim 8, wherein the instructions when executed by a processor further enable the processor to:
generate a coverage report renderable for display via a display device, the coverage report comprising one or more of reset assertion data, destination data toggle data, or jitter error data associated with the jitter injected on the first reset domain.

10. The non-transitory computer readable storage medium of claim 8, wherein the instructions when executed by a processor further enable the processor to:
identify a metastability countermeasure associated with the second sequential element from the circuit design, that if removed, would not result in an unobservable metastability effect becoming observable; and
remove the metastability countermeasure associated with the second sequential element from the circuit design based on the identification, wherein the metastability countermeasures include a gate providing additional timing control of a reset signal affecting the second sequential element.

11. The non-transitory computer readable storage medium of claim 8, wherein the instructions, when executed, further enable the processor to:
in response to determining metastability effects from metastability in the second output are observable at the observation point downstream from the second sequential element in the circuit design, recommend a new metastability countermeasure to include in the circuit design in association with the second sequential element.

12. A system comprising:
a memory storing instructions; and
a processor, coupled with the memory and to execute the instructions, the instructions when executed cause the processor to:
receive an integrated circuit (IC) design file;
identify a reset domain crossing (RDC) path of the IC design file;
inject, during a simulation of IC design file, a RDC jitter error signal into the RDC path; and
generate a coverage report comprising one or more of reset assertion data, destination data toggle data, or jitter error data associated with the RDC jitter error signal in the RDC path.

13. The system of claim 12, wherein the reset assertion data comprises data associated with a source sequential logic element which has a respective reset asserted at least once during the simulation.

14. The system of claim 12, wherein the destination data toggle data comprises data associated with a destination sequential logic element which has a respective data input toggle only due to a reset assertion associated with a source sequential logic element.

15. The system of claim 12, wherein the jitter error data comprises data associated with signals on which RDC hitter error signals were injected.

16. The system of claim 12, wherein the instructions when executed further cause the processor to:
identify, before the simulation of the IC design file, a second RDC path of the IC design file;
determine that the second RDC path is one or more of: static, ignored, or unobservable as being and synchronized by a qualifier signal present between a source sequential logic element and a destination sequential logic element; and
prune, before the simulation, the second RDC path from jitter injection analysis during the simulation.

17. The system of claim 16, wherein determining that the second RDC path is one or more of: static, ignored, or unobservable further comprises:
identifying a plurality of RDCs, including the RDC path and the second RDC path, between flip-flops of a sequence of flip-flops leading to an observation point in the IC design file; and
classifying each RDC of the plurality of RDCs as one of observable at the observation point or not observable at the observation point based on at least one of a reset order and a clock order applied to the sequence of flip-flops.

18. The system of claim 16, wherein the instructions when executed further cause the processor to:
identify a metastability countermeasure associated with the second RDC, that if removed, would not result in an unobservable RDC becoming observable; and
in response to identifying the metastability countermeasure associated with the second RDC path, remove the metastability countermeasure from the IC design file.

19. The system of claim 16, wherein the instructions when executed further cause the processor to:
recommending a metastability countermeasure to include in the IC design in association with the RDC path.

* * * * *